(12) United States Patent
Sahlgren et al.

(10) Patent No.: US 7,260,292 B2
(45) Date of Patent: Aug. 21, 2007

(54) OPTICAL COUPLER

(75) Inventors: Bengt Sahlgren, Saltsjö-Boo (SE);
Mikael Bergman, Järfälla (SE); Johan Pejnefors, Solna (SE); Raoul Stubbe, Stocksund (SE); Sten Helmfrid, Kista (SE); Bengt Johansson, Hägersten (SE)

(73) Assignee: Proximion Fiber Systems AB, Kista (SE)

( * ) Notice: Subject to any disclaimer, the term of this patent is extended or adjusted under 35 U.S.C. 154(b) by 0 days.

(21) Appl. No.: 11/176,448

(22) Filed: Jul. 8, 2005

(65) Prior Publication Data

US 2006/0147153 A1 Jul. 6, 2006

(30) Foreign Application Priority Data

Dec. 30, 2004 (EP) .................................. 04031005

(51) Int. Cl.
*G02B 6/34* (2006.01)
*G02B 6/02* (2006.01)

(52) U.S. Cl. .......................................... 385/37; 385/18
(58) Field of Classification Search ................. 385/37, 385/18
See application file for complete search history.

(56) References Cited

U.S. PATENT DOCUMENTS

| | | | |
|---|---|---|---|
| 3,905,676 A | 9/1975 | Ulrich | |
| 4,466,694 A | 8/1984 | MacDonald | |
| 5,970,190 A | 10/1999 | Fu et al. | |
| 6,360,038 B1* | 3/2002 | Grubsky | 385/28 |
| 6,826,343 B2* | 11/2004 | Davis et al. | 385/126 |
| 6,865,320 B1* | 3/2005 | Westbrook | 385/37 |
| 2002/0122629 A1* | 9/2002 | Grubsky et al. | 385/37 |
| 2002/0181845 A1 | 12/2002 | Kuehnle et al. | |
| 2003/0215185 A1* | 11/2003 | Sirkis et al. | 385/37 |
| 2005/0100073 A1* | 5/2005 | Hughes et al. | 372/70 |
| 2005/0254752 A1* | 11/2005 | Domash et al. | 385/37 |

FOREIGN PATENT DOCUMENTS

| | | |
|---|---|---|
| EP | 0 506 546 A2 | 9/1992 |
| EP | 0 905 472 A2 | 10/1999 |
| GB | 2 366 105 A | 2/2002 |
| JP | 60-191210 A | 9/1985 |
| WO | WO-98/44366 A1 | 10/1998 |
| WO | WO-99/15923 A1 | 4/1999 |
| WO | WO-01/90798 A2 | 11/2001 |
| WO | WO-02/06878 A | 1/2002 |
| WO | WO-03/104880 A2 | 12/2003 |

OTHER PUBLICATIONS

Shikh-Bahaei et al., Proceedings of the First International Symposium on Communication Systems and Digital Signal Processing, Sheffield, UK, Apr. 6, 1998, pp. 423-426.

* cited by examiner

*Primary Examiner*—K. Cyrus Kianni
(74) *Attorney, Agent, or Firm*—Birch, Stewart, Kolasch & Birch, LLP

(57) ABSTRACT

The invention is a spectrally selective optical coupler with a new geometry and a new principle of action. An optical coupler according to the invention comprises an optical fiber and an external lightguide. In the fiber there is provided a deflector that is operative to deflect light of a predetermined wavelength into a propagating mode of said lightguide. The outcoupled light is transferred to a region remote from the outcoupling portion of the fiber. The invention can be used to couple light from a first to a second optical fiber.

11 Claims, 5 Drawing Sheets

OPTICAL COUPLER

TECHNICAL FIELD

The present invention relates to a spectrally selective optical coupler of the type where light is coupled transversally to and from an optical waveguide, such as an optical fiber.

TECHNICAL BACKGROUND

Spectrally selective optical couplers, also known as channel drop or add filters, are utilised for extraction of a single wavelength channel from a broadband optical signal, or for insertion of a single wavelength channel into a broadband optical signal. Typically, spectrally selective couplers are used in wavelength division multiplexed optical communications systems for adding and dropping a single wavelength channel.

Channel drop filters have previously been implemented as dual-waveguide couplers. The article "Narrow-Band Optical Channel-Dropping Filter", Journal of Lightwave Technology, vol. 10, no. 1, January 1992 (Haus et al.) describes an optical channel-dropping filter comprising a first and a second waveguide, the first of which contains a $\lambda/4$ shifted distributed feedback (DFB) resonator. Light propagating in the second waveguide is coupled to the first waveguide by evanescent coupling between the two waveguides. Only one wavelength of light is resonant in the first waveguide, and consequently only that wavelength of light is efficiently coupled to the first waveguide. By making the $\lambda/4$ shifted DFB resonator asymmetric (i.e. the grating is longer on one side of the $\lambda/4$ shift), light can be coupled out of the DFB resonator.

However, prior art channel drop filters have some significant drawbacks and limitations. The filters are difficult to manufacture, due to the fact that very precise placement of the waveguides is required, in order to obtain a reliable evanescent coupling. Furthermore, the prior art filters are difficult to control and tune. The coupling strength and the coupled wavelength is, to a large extent, fixed once the device is assembled. Also, each filter needs to be of a certain size in order for the desired discrimination to be achieved. In particular, when a number of channels are to be dropped separately (e.g. when constructing a demultiplexer), the device needs to be quite large. Yet another problem with the prior art filters is that they are difficult to implement in a fibre configuration, since the evanescent coupling between the waveguides needs to be very accurate. Any perturbation of either of the waveguides can cause large uncontrolled changes in performance.

WO 02/06878 discloses a spectrally selective coupler having a new geometry and a new principle of action compared to yet earlier couplers. It is proposed in that publication to couple light transversally out from an optical fiber by means of a deflector in the form of blazed optical Bragg gratings. Light is coupled transversally from the fiber into an external resonator of the Fabry-Perot type. The light wavelength that is resonant in the external resonator is more strongly coupled to and from the optical fiber. By altering the properties of the external resonator, such as the distance between the reflecting surfaces, the wavelength to be coupled can be tuned.

Although the technology disclosed in WO 02/06878 provided some important improvements over the yet earlier art, some problems still remain. The technology has an inherent geometrical problem, in that the separation between the mirrors of the external resonator must be about 20 µm or less in order to allow convenient tuning. A larger separation gives a shorter free spectral range, and hence a smaller separation between the resonant wavelengths. It turns out that it becomes difficult to arrange two optical fibers within the same external resonator, when coupling from one fiber to another is to be accomplished. This is not only due to the limited space between the reflected surfaces of the resonator, but also due to the fact that both fibers have to be accurately positioned inside the resonator with respect to the two reflective surfaces of the resonator. Moreover, since the resonant mode of the external resonator overlaps spatially with the deflector in the optical fiber, there will be interactions between the light in the external resonator and the light still confined to the core of the fiber. These interactions might disturb the confined light, which propagates inside the core of the fiber.

SUMMARY OF THE INVENTION

Therefore, it is a general object of the present invention to provide an improvement of the art described above. In particular, it is an object of the present invention to address the geometrical problem of transverse coupling of light to and from a waveguide, as well as the problem of remnant interaction between light in the external resonator and the light in the waveguide.

These improvements are obtained by an optical coupler as defined in the appended claims.

The present invention is based on an insight that if light, which is laterally coupled out of an optical fiber, is guided away from the deflecting portion of the fiber, this will facilitate the handling and manipulation of the outcoupled light. In other words, since the outcoupled light is transported away from the deflecting portion of the fiber, the interaction between the outcoupled light and the fiber is eliminated or at least substantially reduced. Hence, a more versatile handling of the light is facilitated, wherein the light remaining inside the core of the fiber is left unperturbed.

The present invention provides a spectrally selective optical coupler, which comprises a first optical fiber having a core and a cladding. In said core there is provided a deflector for deflecting at least some of the light propagating in said fiber core. The deflector is arranged such that the light is deflected out from the fiber laterally under an angle that avoids total internal reflection between the fiber cladding and an outer medium surrounding said cladding. Further, an external lightguide, which is defined by at least a first and a second reflecting surface, is arranged in said outer medium. The optical fiber is arranged between said first and said second reflective surface of the lightguide. The deflector is further arranged to deflect light propagating in said fiber core into a propagating mode of the external lightguide, which light has a predetermined wavelength range, preferably set by the distance between said reflectors. In this context a propagating mode of the external lightguide corresponds to light, which is not just reflected to and fro between the same two surface portions such as in a conventional etalon, but rather transported continuously further in space by e.g. an elongated lightguide.

The light will be coupled out of the fiber into the surrounding medium at different angels, which are determined inter alia by the wavelength of the light in relation to the grating period, and the inclination of the Bragg grating in relation to the propagation axis of the fiber, as is known in the art. Hence, different wavelengths are deflected in slightly different directions. It is possible to arrange the outcoupling angle of the light such that the light will propagate inside the external lightguide. By adjusting the separation between the mirrors of the external lightguide, the free spectral range FSR of the lightguide can be altered. The FSR determines the separation between the wavelengths of propagation modes in the lightguide. By making the FSR of the lightguide sufficiently large, e.g. by making the separation between the mirrors small, only one of the outcoupled wavelengths will be able to propagate inside the lightguide. This wavelength may be called the resonant wavelength of the lightguide.

It should be noted that the light that is transported by the external lightguide will undergo a large number of reflections between the mirrors of this lightguide. Thus, the reflectivity of the mirrors should be very high, preferably more than 99%. Therefore, it is preferred to use dielectric mirrors for the external lightguide.

Preferably, a blazed Bragg grating is used to deflect the light out of the fiber core. Even more preferred is to use an apodized blased Bragg grating. The apodized grating has preferably the properties of a band pass filter. The transform into the spatial domain of an ideal bandpass filter leads to a sinc-function. Normally, only a modified portion of the sinc-function is used, as there is often a desire to keep the length of the deflection grating as short as possible. This can be implemented by breaking off the sinc-function at ±2π and weighting it with a Kaiser window function. Conclusively, the use of an apodized Bragg grating gives a good suppression of distortions for a wide wavelength range.

Preferably, the separation between the mirrors of the external lightguide is controllable, e.g. by electrical tuning. There are at least three advantages related to an optical coupler with tuneable mirrors. Firstly, the same type of optical coupler can be used to control several different wavelengths. Hence, fewer components are needed. Secondly, the performance and operation of the optical system does not have to be determined when the system is assembled, as the resonant wavelength of each respective optical coupler can be tuned afterwards. Thirdly, it is possible to reconfigure such an optical system with regard to a change in the routing of different wavelength channels.

A more improved tuning of the resonant wavelength can be achieved, if at least one of said two mirrors of the external lightguide is divided into several reflective sub sections, wherein each sub section is individually controllable with respect to its distance to the second opposing mirror of said lightguide. In this way, each sub section or sub mirror may, for example, be arranged and tuned such that it compensates for different imperfections of the external lightguide.

In many applications there is a desire to switch the outcoupling of a certain wavelength on and off, without disturbing the other wavelengths, e.g. channel add drop applications. One way of achieving this is to incorporate double blazed filters at the deflecting portion. A wavelength is then laterally decoupled both "upwards" and "downwards" (outcoupled light and fiber core are in a common plane). This wavelength interferes constructively if both mirrors are in the resonant position. By moving the two mirrors "downwards" or "upwards" by e.g. a quarter of a wavelength, this will cause the outcoupled wavelength to interfere destructively, i.e. the drop function of the optical coupler will be switched off. The mirrors should in this case move simultaneously or in small steps in order for the light not to interfere with other channels.

There is also a desire to be able to switch from one channel to another without disturbing any other channels, i.e. switch from one propagating wavelength to another in the external lightguide without scanning through any intermediate wavelength. This can be achieved if, before the separation between the mirrors of the external lightguide is adjusted to fit the new resonant wavelength, the mirrors are arranged such that the outcoupled light from the fiber is not able to propagate in the external lightguide. For example, one of the reflective surfaces of the waveguide is initially rotated or tilted. Preferably, such that the separation distance is decreased between the reflective surfaces at a first end of the waveguide, and increased at the other end of the waveguide. Consequently, no light will propagate in the waveguide and the difference in mirror separation preferably corresponds approximately one FSR between said first and second end of the waveguide. Thereafter, the tilted reflective surface is rotated back, such that the two reflective surfaces are again in parallel with each other. This axis of rotation is, preferably, chosen such that the new separation distance between the reflective surfaces corresponds to the new desired propagating wavelength.

Alternatively, an absorbing section is introduced in the light path of the external lightguide. While the external lightguide is in this non resonant condition, the separation between the mirrors in the external lightguide is adjusted to correspond to the new resonant wavelength, before the absorbing section is removed.

Advantageously, the outcoupled light is guided by said lightguide to a region which is remote from said first optical fiber. In this way the light is prevented from interacting with the fiber, and at the same time the handling and modulation of the light is facilitated. Further, the ability of guiding the light away from the fiber gives many options when it comes to the design of the optical coupler, as the light can be handled with a large degree of freedom.

In one embodiment of the invention, light is coupled out of a first optical fiber, and at least some of the outcoupled light is later coupled into a second optical fiber or back into the first optical fiber. When the light is coupled back into the first optical fiber, the light can either be coupled back at the portion of the fiber where it was coupled out, or it can be coupled back at a different portion of the fiber.

The outcoupled light may be guided by the external lightguide in a direction parallel with the core of the fiber. The lightguide may be terminated by a retro-reflector downstream of the deflecting portion of the fiber. Consequently, the light may be guided back towards the deflecting portion of the fiber, where it may be coupled into the core of the fiber in a direction opposite to the one it had before it was coupled out. The retro-reflector can be conveniently obtained by making the reflecting surfaces of the external lightguide slightly inward-slanting (i.e. towards the fiber), such that the propagation direction for the mode within this lightguide is reversed. Again, the resonant wavelength of the lightguide is tuneable in a convenient manner. The tuneability is equal to the FSR.

In a different embodiment of the invention the light may be coupled out of an optical fiber, without being coupled back into the same fiber or into another fiber. Instead the light may simply dropped, or if desired it can be analysed.

By bringing the light away from the portion of the fiber containing the deflector, more degrees of freedom are introduced when it comes to handling and manipulating the light.

Advantageously, the external lightguide may comprise a first, second and third lightguiding portion. These portions can be arranged as separate devices, but are preferably joined to each other in order to facilitate the arrangement of the fibers. The first lightguiding portion is arranged to guide outcoupled light from a first deflecting portion of the fiber towards said second lightguiding portion, preferably along the light propagation axis of the fiber, until the light reaches beyond said first deflecting portion. Said second lightguiding portion is arranged to receive light from said first lightguiding portion and to guide said light towards said third lightguiding portion. Said third lightguiding portion is arranged to receive light from said second lightguiding portion and to couple said light into a second optical fiber. The incoupling of the light into the second fiber works as a time reversal of the outcoupling of the light from the first fiber.

Advantageously, the transfer of the received light by said second lightguiding portion is performed either by waveguiding reflection or by lens action. If waveguiding action is used, the received light is bound between two reflective surfaces of said second lightguiding portion. On the other hand, if lens action is used the received light is directly mirrored, by e.g. an elliptical reflective surface of said second lightguiding portion, to a receiving portion of said third lightguiding portion. When waveguiding action is used, preferably at least one of the reflecting surfaces is curved in a dimension non-parallel to the propagation axis of said lightguide, such that light is more easily confined therein. Advantageously, when the deflector and/or the external lightguide is highly polarization dependent, an additional external lightguide arrangement can be used. This additional arrangement is preferably arranged similar to said first lightguide arrangement, but is rotated 90 degrees around said first fiber, compared to said first arrangement in order to handle the orthogonal polarization direction.

In order to make sure that a desired wavelength is completely dropped a band-stop filter or a reflecting filter might be arranged after the deflecting portion(s) of the fiber, in the propagation direction of the light which is to be dropped.

BRIEF DESCRIPTION OF THE DRAWINGS

In the following, a number of preferred embodiments of the present invention will be described in greater detail. The various objects and advantages of the invention will be more fully appreciated when the detailed description is read in conjunction with the accompanying drawings.

In the figures, like parts are designated by like reference numerals.

DETAILED DESCRIPTION OF THE INVENTION

Figure 1:
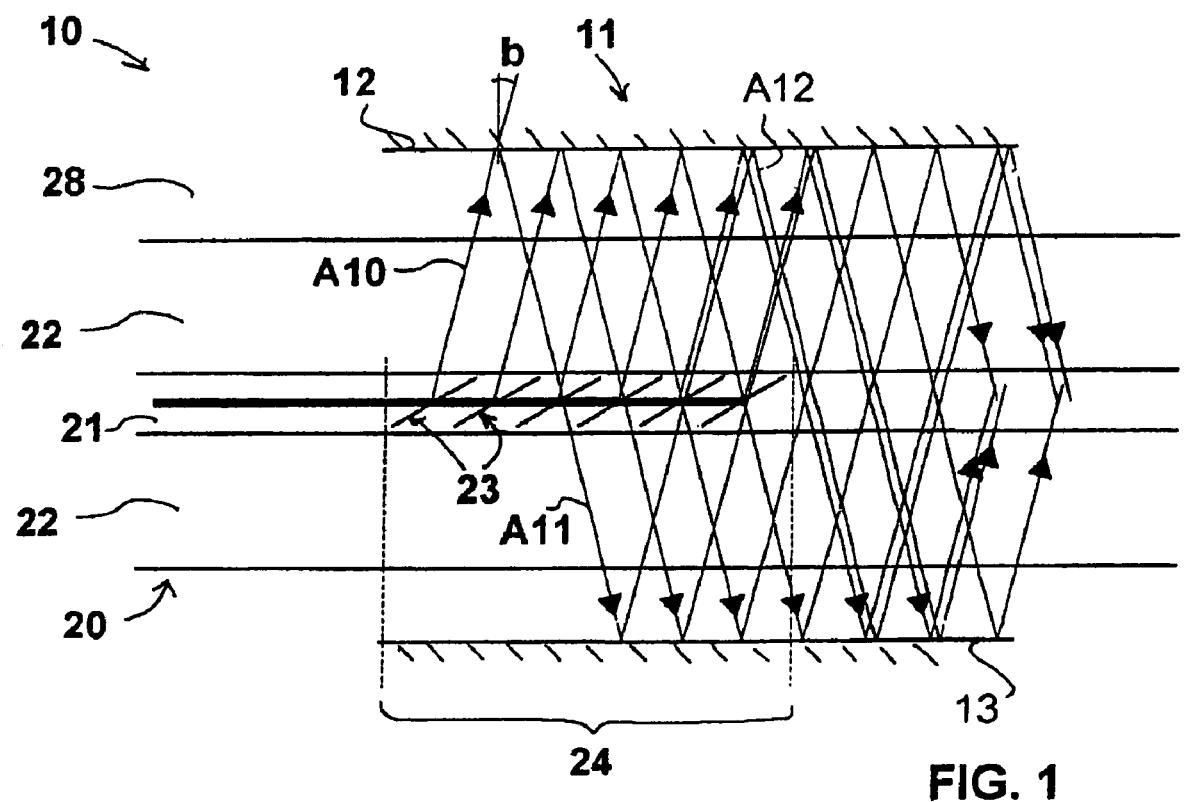
FIG. 1 schematically shows a principal operation of the invention.

In FIG. 1, a selective optical coupler 10 is shown comprising an optical fiber 20 and an external lightguide 11. The optical fiber comprises a core 21, a cladding 22 and a deflector 23. The deflector is comprised of an optical Bragg grating. The optical Bragg grating 23 is blazed (i.e. tilted) with respect to the fiber core, in the sense that boundaries between domains of the Bragg grating are non-parallel to the electromagnetic field of light propagating in the fiber. The deflector 23 is operative to deflect light propagating in the core 21 of the optical fiber 20 into said external lightguide 11. The lightguide 11 is defined by a first mirror 12 and a second mirror 13, which are arranged on two opposite sides outside said fiber 20. In this preferred embodiment, the mirrors 12 and 13 are essentially parallel to the fiber core, thereby defining a lightguide in which a resonant wavelength of the deflected light will propagate along the fiber. Whether light that is propagating in the fiber core is deflected by the Bragg grating or not is determined by e.g. the wavelength of the propagating light, and the angle of inclination of the grating (its blaze angle) in relation to the fiber core.

The angle at which the light is coupled out of the fiber, into the surrounding medium, is determined by the wavelength of the propagating light with respect to the grating period, the angle of inclination of the grating, and the index of refraction in the cladding and the core of the fiber. The deflector can be arranged to deflect essentially all wavelengths propagating in the core into the external lightguide. In this case, the free spectral range of the external lightguide 11 is preferably larger than the entire wavelength range of the optical signals at issue, in order to ensure that only one wavelength channel will propagate in the external lightguide 11. Care should be taken when arranging the fiber, such that the desired outcoupled wavelength corresponds to a mode which is able to propagate inside the external lightguide 11. As can be seen in FIG. 1, the light is coupled out into the surrounding medium 28 at an angle b, with respect to a transversal direction of the fiber. The angle b is chosen such that the light will propagate in the lightguide.

The choice of angle b is an optimization between the final length of the device and the wavelength selectivity on one hand and the FSR and the sensitivity to reflector imperfections on the other hand. For the same distance between the reflectors defining the external lightguide a larger angle b means a larger FSR, but the wavelength selectivity decreases for large angles unless the deflector section is made very long. Preferably, the angle is between 5 and 15 degrees.

Only a small portion of the light is coupled out at each grating element, therefore, the grating has to be made sufficiently long, such that a desired amount of light is coupled out. Arrows A10, A11, A12 indicate the propagation direction of the light. Naturally, since the propagation of light is time invariant, the deflector 23 is also operative to deflect light propagating inside said lightguide 11 into the fiber 20 and the fiber core 21. Once the light has been guided by the mirrors 12 and 13 away from the deflecting portion 24 of the fiber, i.e. to a region beyond the longitudinal portion of the fiber comprising the deflector, the interaction of the light with the fiber is essentially eliminated.

Figure 2:
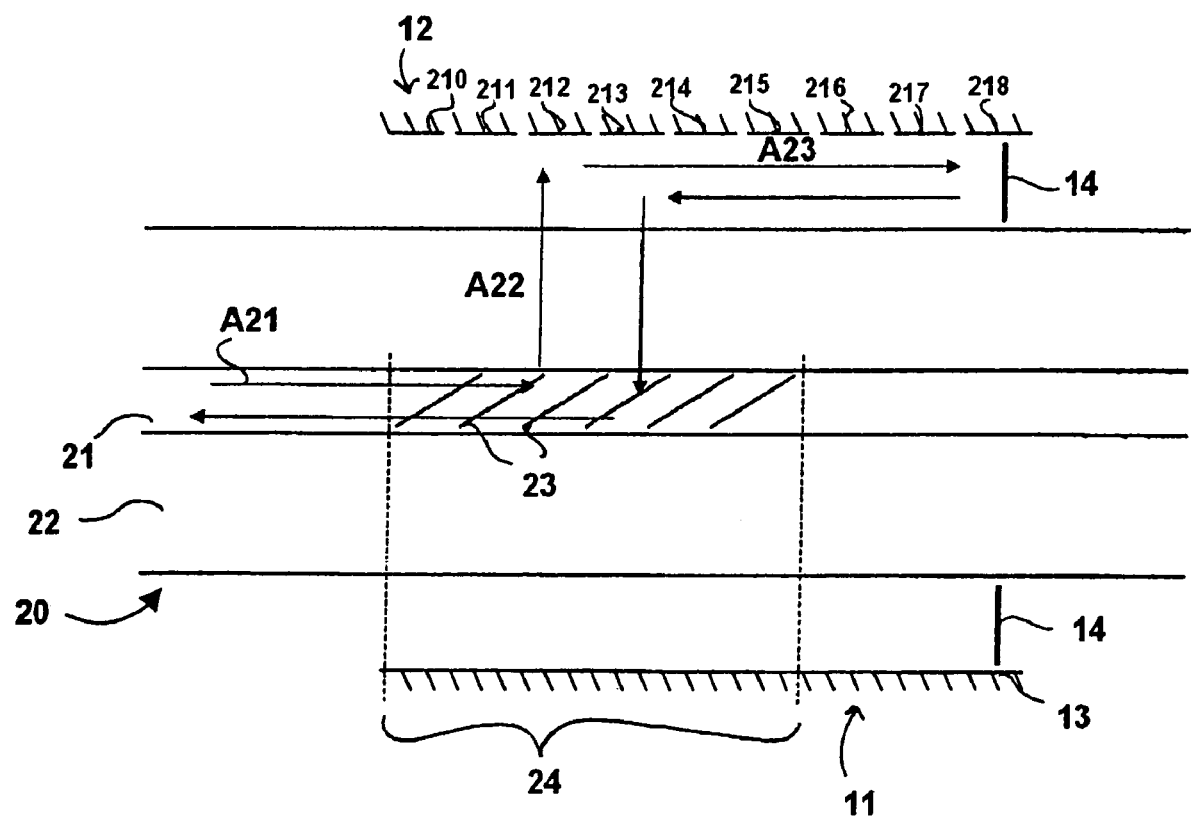
FIG. 2 schematically shows how outcoupled light is modulated and coupled back into the fiber.

A second embodiment of the invention is schematically shown in FIG. 2. This arrangement is similar to the one shown in FIG. 1, except the arrangement of said first mirror 12, and that the external lightguide 11 is terminated by an optical modulator 14. In this embodiment the first mirror 11 of said external lightguide is formed by several sub mirrors 210-218, wherein each of these sub mirrors can be controlled individually with respect to their orientation and position. Manufacturing a large mirror with ideal properties, e.g. absolutely flat, is difficult and it is even harder to make a working pair of mirrors. Therefore, in this embodiment, one of the mirrors is divided into a set of sub-mirrors 210-218. By arranging each of these in its ideal position and orientation, a more optimised lightguide can be achieved. The outcoupling of the light and the guidance of said light works in essentially the same way in this embodiment as was described in relation to FIG. 1. In FIG. 2, more schematic arrows are used to describe the propagation of the light. A first arrow A21 indicates the propagation direction of the light in the core of the fiber. A second arrow A22 indicates the direction in which the light is coupled out of the fiber. A third arrow A23 indicates the initial propagation direction of said outcoupled light, this direction is the same as is illustrated by the arrows A10-A13 in FIG. 1. In FIG. 2 the outcoupled light is reflected after it has interacted with the modulator 14, and is guided back towards the deflecting portion 24 of said fiber. The optical modulator can thus be arranged as a wavelength selective modulator. When the light again reaches the deflecting portion 24 it is coupled into the fiber by the deflector 23 and propagates in the core of the fiber in an opposite direction. Hence, this direction is opposite to the propagation direction the light had before it was coupled out of the core of the fiber.

Figure 3:
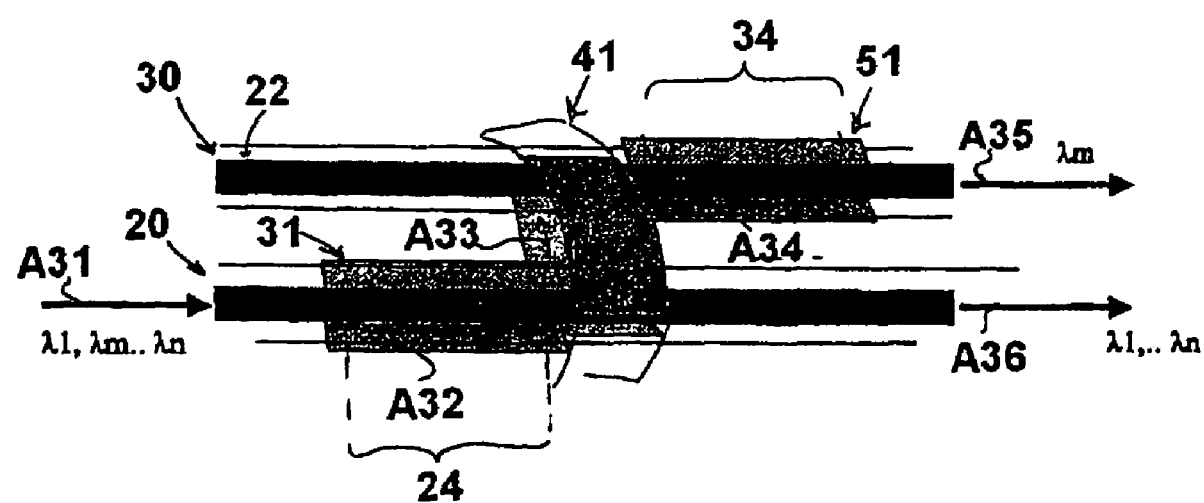
FIG. 3 schematically shows how light is coupled out of a first optical fiber and into a second optical fiber according to a first embodiment of the invention.

FIG. 3 schematically shows an embodiment of the present invention wherein one wavelength channel $\lambda_m$ is coupled from a first optical fiber 20 to a second optical fiber 30. The two optical fibers 20 and 30 are arranged a small distance apart, approximately 30 µm, and in parallel with each other. Said first optical fiber 20 and a first lightguiding portion 31 of the external lightguide are arranged in accordance with what has been described in relation to FIG. 1. Light corresponding to several wavelength channels $\lambda_1, \ldots, \lambda_m, \lambda_n$ may propagate inside the core of said first fiber in a direction which is illustrated by a first arrow A31. At a deflection portion 24, light to which said first portion of the external lightguide is resonant, is coupled out of said first fiber 20 and into said first lightguiding portion 31, where it propagates towards a second lightguiding portion 41 along the propagation axis of said first fiber 20, as is indicated by a second arrow A32. The second lightguiding portion 41 receives the propagating light, from said first lightguiding portion 31, after the light has passed the deflection portion 24, and guides it towards said second fiber 30 and a third lightguiding portion 51. The propagation direction in said second lightguiding portion 41 is, in this embodiment, substantially orthogonal to said first propagation direction A31, as illustrated by a third arrow A33. When the light reaches said third lightguiding portion 51, it is guided by it along a deflection portion 34 of said second fiber, as is indicated by a fourth arrow A34. At the deflection portion 34, the propagating light is coupled into said second fiber 30, in a way which is a time reversal of said outcoupling of the light from said first fiber 20. The incoupled light propagates along the core of said second fiber as indicated by a fifth arrow A35.

If light propagates along said second fiber it will be coupled into said first fiber at its deflection portion, in accordance with what has been explained above. Hence, an optical wavelength channel can both be added and dropped by the same optical coupler arrangement. By adjusting the separation between the mirrors of said external lightguide, the added or dropped wavelength can be changed or tuned. The wavelengths which are not coupled out of said fiber remain in said first optical fiber, substantially undisturbed.

Figure 4:
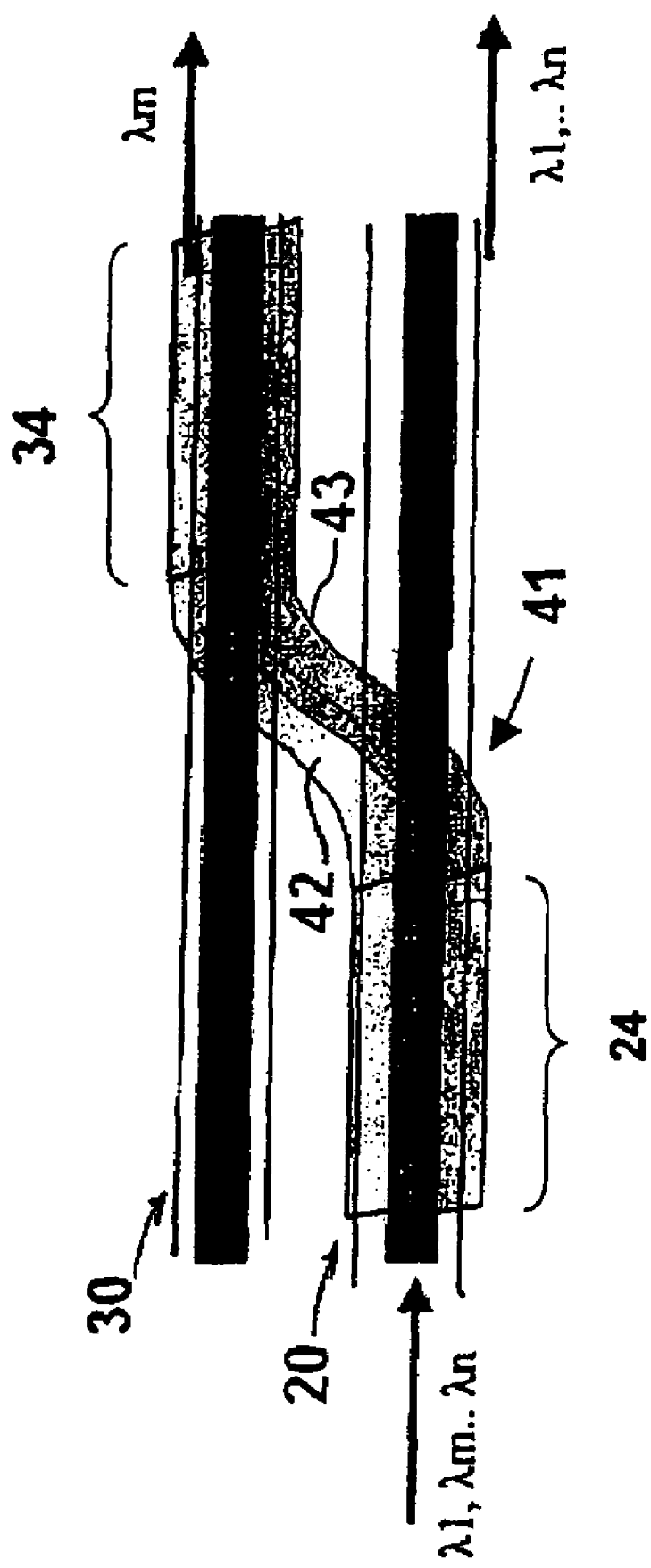
FIG. 4 schematically shows how light is coupled from a first fiber to a second fiber by an optical coupler according to a second embodiment of the invention.

FIG. 4 schematically shows a further embodiment wherein light is coupled from a first optical fiber 20 to a second optical fiber 30 in accordance with the invention. This embodiment is designed in a similar manner as the embodiment shown in FIG. 3, except that another design of the second lightguiding portion 41 is used. The second lightguiding portion comprises a first mirror 42 and a second mirror 43. Here the second lightguiding portion does not direct the propagating light substantially orthogonal to the propagation axes of the fibers. Instead, the propagation direction of the outcoupled light is gradually changed, beginning at a point after the deflection portion 24 of the first fiber 20, where it propagates in a direction parallel to the first fiber core, and ending at a point before the deflection portion 34 of said second fiber, where the light propagates parallel to said second fiber. "Before" and "after" are here related to the propagation direction of the outcoupled light, i.e. upstream and downstream. Preferably, one of the mirrors 41 has a radius of curvature of between 100 and 200 nm, in order to ensure a better control of the light. Further, the whole upper reflective surface of the lightguide might be formed in one continuous piece. In other words, an upper lightguiding unit comprising the upper reflective surface(s) of said first, second and third lightguiding portion. Correspondingly, a lower lightguiding unit might comprise the lower reflective surface(s) of said first, second and third lightguiding portion.

Figure 5:
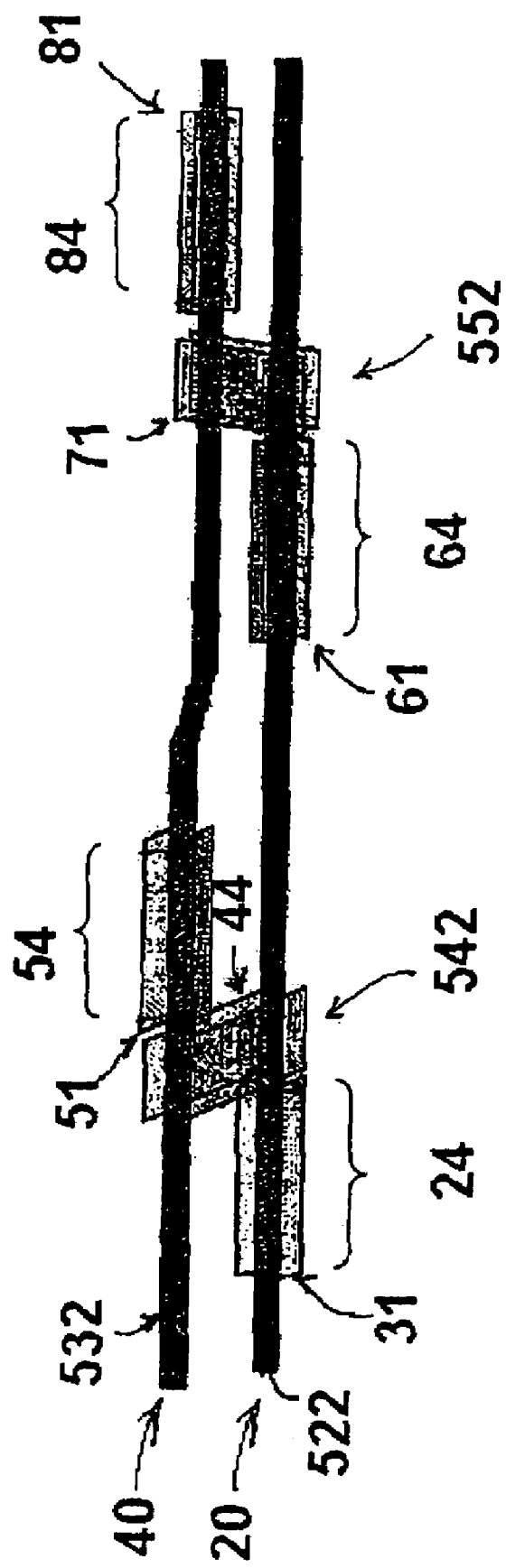
FIG. 5 schematically shows how a first and a second polarization direction of the light is coupled by a first and a second optical coupler, respectively, from a first optical fiber to a second optical fiber.

The outcoupling of the light might to a large degree be polarization dependent. Therefore, two optical couplers might be used, in order to couple out both polarization directions of a wavelength channel from the core of a first fiber 20, as shown in FIG. 5. Both polarisation directions can be coupled to the core of the second fiber 40 by the use of two optical coupler 542;552, each comprising a first lightguiding portion 31;61, a second lightguiding portion 44;71 and a third lightguiding portion 51;81. These may all be designed in accordance with what has been described in relation to FIG. 3 or 4. The two fibers comprise respective first deflection portions 24;54, and respective second deflection portions 64;84. The deflector in said second deflection portion 64;84 is rotated 90 degrees about the propagation axis of the fiber core 522;532, compared to the deflector arranged in said first deflection portion 24;54. Further, the fibers 20 and 40 are arranged such that the second optical fiber 40 first runs in parallel with the first fiber 20 in a first plane. Thereafter, the second fiber 40 is redirected such that it runs in parallel with the first fiber 20 in a second plane, which is orthogonal to said first plane. Consequently, both the first and the second optical coupler is arranged as described in relation to FIG. 3, but mutually orthogonally to each other in a manner such that two orthogonal polarization directions can be handled. Hence, a first polarisation direction of the propagating light is coupled out at said first deflection portion 24 of said first fiber 20, and a second polarisation direction is coupled out of said first fiber 20 at a second deflection portion 64. Said first polarisation direction is coupled into said second fiber 40 at its first deflection portion 54, and said second polarisation direction is coupled into said second fiber 40 at its second deflection portion 84.

Correspondingly, light can be coupled from said second fiber to said first fiber, due to the time reversibility of the optical system, in accordance to what has been described above.

CONCLUSION

To conclude, the general idea underlying the invention is to deflect light of a selected wavelength laterally out from an optical fiber and to lead such light away from the region where it can interact with the fiber core. The light of the selected wavelength then becomes separated from the light remaining in the fiber, such that it may be handled and manipulated more conveniently. In particular, light of the selected wavelength may be guided to a second optical fiber and introduced into this second fiber laterally, also by means of a light deflector in the core of this fiber. To obtain good discrimination for the selected wavelength, the light deflected out from the optical fiber is transported by a resonant lightguide.

The present invention is a further development and improvement of the art disclosed in U.S. Pat. No. 6,501,879, wherein the perhaps most important improvement resides in that the light coupled out from the optical fiber can be more freely handled and manipulated. The lightguide for transporting the light deflected from the fiber advantageously comprises a pair of reflecting surfaces, such as mirrors, wherein the separation of these mirrors is adjustable such that the spectral selectiveness of the lightguide may be tuned. Therefore, the present invention preserves the advantages provided by U.S. Pat. No. 6,501,879, and provides some additional important advantages.

For example, the present invention provides a broader tuneability than the prior art, since more freedom is allowed in terms of placement and design of the external lightguide. In particular, when coupling light from one fiber to another, it is no longer necessary to squeeze both fibers into a narrow space between two mirrors. In the prior art, this was an obstacle, because the separation between the mirrors should be about 20 μm or less in order to provide the required tuneability.

The invention claimed is:

1. A spectrally selective optical coupler, comprising
a first optical fiber having a light guiding core arranged to guide light along a predetermined path, and a cladding surrounding said core;
a deflector provided in said core, operative to deflect at least part of any light propagating in the core out from the fiber under an angle that avoids total internal reflection between the cladding and a medium surrounding said cladding; and
an external lightguide defined by at least a first reflecting surface and a second reflecting surface, wherein the optical fiber is positioned between said first reflecting surface and said second reflecting surface,
wherein the deflector is arranged to deflect light, within a predetermined wavelength range, from said core into a propagating mode of the external lightguide, and
wherein the separation between said first reflecting surface and said second reflecting surface of the external lightguide is adjustable, such that the allowed wavelength range of the propagating mode can be tuned.

2. The spectrally selective optical coupler according to claim 1, wherein the propagating mode is coupled into the lightguide at a deflecting portion of said fiber and said external lightguide is arranged to guide said propagating mode to a region remote from said deflecting portion.

3. The spectrally selective optical coupler according to claim 2, wherein said external lightguide comprises:
a first lightguiding portion, which is arranged to guide said propagating mode in a first direction along and beyond a first portion of said optical fiber containing said deflector;
a second lightguiding portion, which is arranged to receive a propagating mode from said first lightguiding portion, and to guide said mode to a region remote from said optical fiber.

4. The spectrally selective optical coupler according to claim 3, further comprising an optical modulator which is adapted to modify a predetermined property of the propagating mode.

5. The spectrally selective optical coupler according to claim 3, further comprising:
a third lightguiding portion, which is arranged to receive said propagating mode from said second lightguiding portion and to guide said mode along a first portion of a second optical fiber, such that the light is coupled into said fiber, wherein a core of said second optical fiber comprises a deflector.

6. The spectrally selective optical coupler according to claim 1, wherein said first reflective surface is divided into at least a first and a second sub-mirror, each sub-mirror being individually adjustable.

7. The spectrally selective optical coupler according to claim 1, wherein at least one of said first reflective surface and said second reflective surface can be tilted, such that any light propagating in the core of said fiber is prevented from propagating in said external lightguide.

8. The spectrally selective optical coupler according to claim 1, wherein said deflector is a Bragg grating.

9. The spectrally selective optical coupler according to claim 8, wherein said deflector is a single blazed Bragg grating.

10. The spectrally selective optical coupler according to claim 9, wherein said deflector is a single apodized blazed Bragg grating.

11. The spectrally selective optical coupler according to claim 1, wherein at least a portion of at least one of the first reflecting surface and the second reflecting surface of said external lightguide is a concave cylindrical surface, in order to facilitate the guiding of said propagating mode in said external lightguide.

* * * * *